United States Patent [19]

Gravesteijn et al.

[11] Patent Number: 4,508,811
[45] Date of Patent: Apr. 2, 1985

[54] RECORDING ELEMENT HAVING A PYRYLIUM OR THIOPYRYLIUM-SQUARYLIUM DYE LAYER AND NEW PYRYLIUM OR THIOPYRYLIUM-SQUARYLIUM COMPOUNDS

[75] Inventors: Dirk J. Gravesteijn, Eindhoven, Netherlands; Christiaan Steenbergen, Colorado Springs, Colo.; Jan Van der Veen; Wilhelmus P. M. Nijssen, both of Eindhoven, Netherlands

[73] Assignee: U.S. Philips Corporation, New York, N.Y.

[21] Appl. No.: 547,149

[22] Filed: Oct. 31, 1983

[30] Foreign Application Priority Data

Jan. 17, 1983 [NL] Netherlands .......................... 8300155

[51] Int. Cl.³ .............................................. G03C 1/78
[52] U.S. Cl. ................................... 430/270; 430/271; 430/495; 430/496; 430/537; 430/945; 346/76 L; 346/135.1; 549/13; 549/415
[58] Field of Search ............... 430/270, 271, 537, 495, 430/496, 945; 346/135.1, 76 L; 549/415, 13

[56] References Cited

U.S. PATENT DOCUMENTS 3,617,270 11/1971 Kampfer et al. ...................... 430/92
3,824,099 7/1974 Champ et al. ......................... 430/58

OTHER PUBLICATIONS

Loutfy et al., Photographic Science and Engineering, vol. 27, No. 1, pp. 5–9, 1983.
Jipson et al., J. Vac. Sci. Technol., vol. 18, p. 105, 1981.

Primary Examiner—J. Travis Brown
Attorney, Agent, or Firm—Norman N. Spain

[57] ABSTRACT

An optical recording element having a recording layer which comprises an alkylpyrylium-squarylium dye, as well as novel alkylpyrylium-squarylium compounds.

4 Claims, 1 Drawing Figure

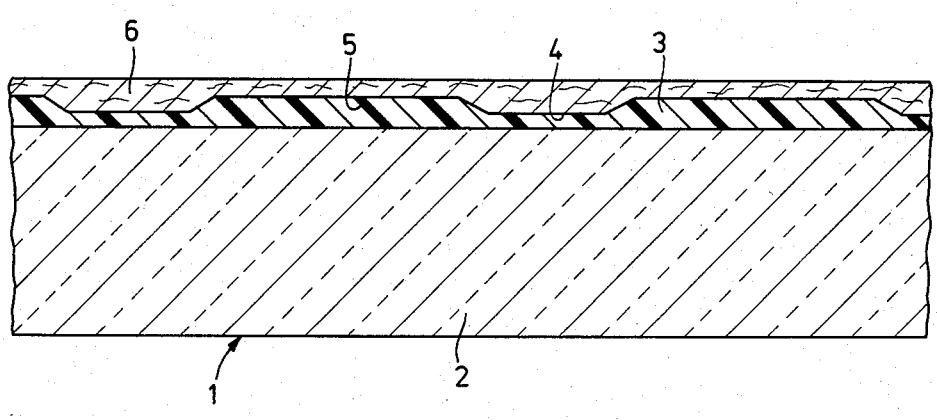

RECORDING ELEMENT HAVING A PYRYLIUM OR THIOPYRYLIUM-SQUARYLIUM DYE LAYER AND NEW PYRYLIUM OR THIOPYRYLIUM-SQUARYLIUM COMPOUNDS

BACKGROUND OF THE INVENTION

The invention relates to a recording element in which information can be recorded and read optically, and which comprises a supporting plate and a recording layer which layer is provided on the supporting plate and which comprises a squarylium dye.

Such a recording element is known from J. Vac. Sci. Technol., Vol. 18, No. 1 (January–February, 1981). The squarylium dye in question is a 4-dimethylamino-2-hydroxyphenyl-squarylium compound which corresponds to the formula

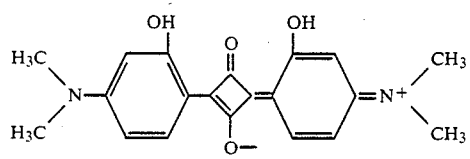

The disadvantage of the known element is that the squarylium dye used therein is soluble only in reactive and aggressive solvents, for example, primary and secondary amines. As a result of this the manufacture of the element is considerably impeded. Further solutions of the dye in the amines are not stable. The dye degrades considerably. According to the IBM Technical Disclosure Bulletin Vol. 22, No. 10, March 1980, the solubility of this dye can be improved by replacing a $CH_3$-group of the dimethylamino group by a long alkyl group. The squarylium dyes thus modified dissolve in hot ethanol, in hot acetone, in cold chloroform and in cold methylene chloride. However, the spin coating of hot solutions on the supporting plate so as to provide a dye layer presents problems. The solvents chloroform and methylene chloride attack the supporting plate if it is manufactured from, for example, an acrylate synthetic resin.

The above squarylium dyes have a low light absorption at a wavelength of 800 nm and higher so that the AlGaAs laser which is cheap and interesting in itself cannot be used for writing information. The low absorption also means that reading or display of information presents problems. Furthermore optical structures in the form of, for example, recording tracks or guide tracks cannot be provided in the recording layer of the known squarylium dye, which tracks are considered to be of great importance both for recording information and for reading recorded data.

SUMMARY OF THE INVENTION

It is the object of the invention to provide a recording element which does not exhibit the above-mentioned problems or only to a considerably reduced extent.

This object is achieved by means of a recording element of the above-described type which according to the invention is characterized in that the dye is a pyrylium- or thiopyrylium-squarylium compound which satisfies the formula

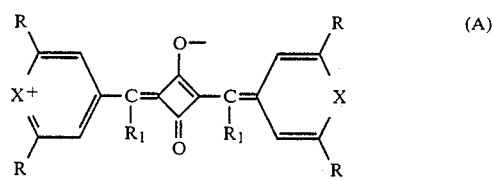

wherein
X is an oxygen atom or a sulphur atom,
R is an alkyl group having at least 3 carbon atoms, and
$R_1$ is a hydrogen atom or methyl.

The alkyl group is preferably a branched alkyl group having at least 4 carbon atoms, for example, a neopentyl group. A very suitable alkyl group is a tertiary butyl group. Preferably $R_1$ is a hydrogen atom.

For convenience these compounds used in the element according to the invention will hereinafter be referred to as alkylpyrylium-squarylium dyes or compounds.

The alkylpyrylium-squarylium dyes are novel compounds. The substances are readily soluble in the usual non-reactive organic solvents, for example, alcohols, ketones, esters, hydrocarbons, for example toluene and acetonitrile.

In the Table, below, two alkylpyrylium-squarylium dyes are disclosed which are preferably used in the element according to the invention. The solubility at 25° C. of the dyes in various organic solvents is recorded in the Table. The solubility is expressed in grams of dye per liter of solvent.

TABLE

| Compound of the formula | n-propanol | acetonitrile | ethylacetate | methyl-ethyl-ketone | toluene |
|---|---|---|---|---|---|
| (I) | 46 | 6 | 25 | >50 | 33 |

TABLE-continued

| Compound of the formula | n-propanol | acetonitrile | ethylacetate | methyl-ethyl-ketone | toluene |
| --- | --- | --- | --- | --- | --- |
| 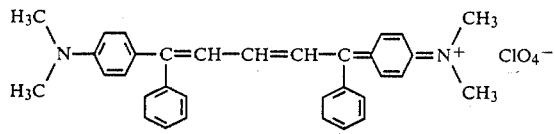 (II) | >50 | 2 | 5 | 16 | 21 |

In the manufacture of the recording element, the alkyl-pyrylium-squarylium compounds are used in the form of solutions in an organic solvent. The solutions are provided on the surface of the supporting plate. By evaporating the solvent, a solid layer of the dye is obtained. Mixtures of alkylpyrylium-squarylium compounds with other organic materials, for example, other dyes or polymeric compounds, may also be used. Said additional substances must be soluble in the solvents used.

In a favourable embodiment of the element in accordance with the invention, a recording layer is used which comprises a pentamethine dye in addition to an alkylpyrylium-squarylium compound. As a result an increase of the absorption of the recording layer can be achieved which presents advantages upon reading or tracking a structure provided in the recording layer, for example a recording track. The use of such a structure will be explained in detail hereinafter.

A suitable pentamethine compound satisfies the formula $$\begin{array}{c} H_3C \\ \diagdown \\ N \\ \diagup \\ H_3C \end{array} \!\!-\!\!\! \bigcirc \!\!-\!\! C \!=\! CH \!-\! CH \!=\! CH \!-\! C \!\!-\!\! \bigcirc \!\!=\! N^+ \begin{array}{c} CH_3 \\ \diagup \\ \diagdown \\ CH_3 \end{array} ClO_4^-$$

In addition to the alkylpyrylium-squarylium dye the recording layer may also comprise a polymeric compound, for example, polyvinylbutyral, polystyrene or polymethylmethacrylate, in which layer the concentration of the dye is at least 70% by weight. The polymeric compound has a stabilizing influence and prevents crystallization of the dye.

The supporting plate may be provided with a solution of an alkylpyrylium-squarylium compound by any conventional method, namely by pouring, spraying or atomizing the solution onto the surface of the supporting plate. The supporting plate may also be dipped in the solution in which, if no special measures are taken, a two-sided coating with dye takes place.

The above application method which is based on the use of solutions hence of liquids, has great advantages as compared with, for example, a vapour deposition process or a sputtering process. Solutions can be made entirely free, for example by filtration, from contaminations, such as dust particles. The resulting layer of dye has a high purity. Moreover, such an application process can be carried out at normal temperature and pressure and in one continues run. A vapour deposition process or sputtering process does not have these advantages. In particular the dust problem plays an important part in a vapour deposition process or in a sputtering process.

A preferably used application process is the so-called spin-coating process with which very small thicknesses of the layer of dye can be obtained in a reproducible manner. According to the spin-coating process the supporting plate which is in the form of a circular disk is placed on a turntable. The dye solution is deposited on the disk and the disk is then rotated at a speed varying from 200 to 2000 rpm. The solutions spreads over the surface of the disk and will partly flow over the edge of the disk. After some time the solvent is evaporated and a solid layer of the alkylpyrylium-squarylium dye is obtained. The thickness of the layer is determined by various factors, for example, the speed of rotation, the nature of the solvent, and the concentration of the alkylpyrylium-squarylium dye in the solvent.

By a suitable choice of the above-mentioned factors, a desired layer thickness can be adjusted. Since the alkylpyrylium-squarylium compounds used in the element in accordance with the invention can be dissolved in various concentrations in various solvents or mixtures of solvents, a range of possibilities of choice is available. Preferably solutions are used which comprise at most 10% by weight of dye.

A suitable layer thickness of the layer of dye in the element is from 20 to 200 nm and in particular from 40 to 100 nm.

For recording information, the element which usually is in the form of a disk and which will hereinafter be termed information disk, is rotated at a speed of approximately 150–1800 rpm. The recording layer of the alkylpyrylium-squarylium dye is exposed to energy-intensive light, in particular laser light which is pulsated in accordance with the information to be recorded and which is focused on the recording layer. A hole or cavity having a thickened edge portion is formed in each of the exposed places. The alkylpyrylium-squarylium compounds are extremely sensitive to laser light, in particular laser light having a wavelength of 750–850 nm. Compound I recorded in the Table, for example, has an absorption maximum at 820 nm and compound II has an absorption maximum at a slightly lower wavelength of approximately 750 nm. Due to the great sensitivity a cavity can be formed in the recording layer with a small amount of laser light energy of, for example, 0.06–1 nJ. The pulse time is approximately 10–100 ns, which results in a high recording speed. The novel alkylpyrylium-squarylium dyes used in accordance with the invention also have the important advantage that the dimensions of the cavities are accurately defined. The cavities may be circular or as a result of the rotation of the information disk, they may also be in the form of a trough. The diametrical or longitudinal dimensions (in the case of the trough form) of the cavities are small and are on a micron scale, for example from 0.3 μm to 10 μm. A high information density can be realized. Due to the good cavity definition, cavities of various accurately adjustable longitudinal dimensions can be obtained by means of a suitable exposure technique. As a result of this the information cannot only be recorded digitally on the basis of "cavity-no-cavity", but analogue recording is also possible in which the longitudinal dimensions of the cavities and the parts of the layer of dye present between the cavities play a part. It is also possible to adjust different depths of the cavities, which presents an extra recording possibility. Complicated video information can be recorded in the recording element in accordance with the invention, the dimensions of the element being small, for example, a disk-shaped element having a diameter of, for example, 30 cm. The recording of information is preferably carried out by means of laser light having an emission wavelength of approximately 800–840 nm originating from a cheap AlGaAs laser.

Upon reading the recorded information bits, the recording layer of the alkylpyrylium-squarylium compound is scanned by means of weak laser light which is focused on the recording layer. The scanning laser light, by way of example, is weaker than the recording light by a factor of 10.

The alkylpyrylium-squarylium compounds used in accordance with the invention show a sufficient reflection of, for example, 20–30%. The amount of reflected light in the first instance depends on the wavelength of the scanning laser light. A layer of the alkylpyrylium-squarylium compounds presents the advantage which is attractive for practical use in that the highest reflection is achieved in the wavelength range in which the layer also has a maximum absorption and hence a minimum transmission. As a result of this the recording layer can be read in reflection and preferably via the supporting plate. Reading via the supporting plate which is transparent to the scanning laser light has the advantage that contaminations, for example, dust particles or scratches on the surface of the supporting plate fall beyond the depth of focus of the objective which focuses the laser light so that said contamination do not have any detrimental influence on the quality of reading. The comparatively high reflection enables a good focusing of the laser light on the layer of the alkylpyrylium-squarylium dye. At the same wavelength, both recording and reading of information can take place. Hence one laser light source will suffice, for example an AlGaAs-laser, which for reading information is adjusted to a weaker power than for writing information. The high reflection at wavelengths of approximately 800 nm causes an excellent signal-to-noise ratio with an average value of 50 dB and a maximum value of 65 dB. The maximum value is reached particularly if flat supporting plates, for example, flat ground grass plates or flat plates of a transparent synthetic resin, for example polymethylmethacrylate or polycarbonate, are used.

The reflection of a layer of an alkylpyrylium-squarylium compound furthermore depends on the thickness of the layer. A reflection maximum is reached with a thickness of approximately 60–70 nm. Thickness variations around said range of 60–70 nm result in a comparatively strong change in reflection. The thickness of the recording layer is preferably chosen around the above range, so, for example, of 40–400 nm. An information bit in the form of a cavity present in the information layer is traced on the basis of reflection differences with the surrounding part, that is to say with the part of the recording layer present around the cavity. At the area of the cavity the thickness of the recording layer has decreased and hence the reflection is less. Due to the favourable reflection behaviour of alkylpyrylium-squarylium compounds, deep and less deep cavities can be distinguished on the basis of reflection differences so that recording is possible at two levels.

As a result of the high light absorption of the recording layer of an alkylpyrylium-squarylium compound, it may be provided with an optical structure, in particular a track structure, which can read optically on the basis of phase differences of the reflected light.

The desired optical structure can be obtained by providing the supporting plate with a profile on the side abutting the recording layer. A suitable profile is a groove which is provided in the supporting plate and which has a spiral-shape or may be built-up from concentric circles. Due to the liquid application method the grooves will be entirely filled with the alkylpyrylium-squarylium dye so that the layer thickness of the dye is larger at the area of the grooves than at the area of the so-called dikes present between the grooves. The groove can be followed by laser light focused upon the recording layer via the supporting plate, due to the phase difference between the light reflected by the recording layer at the site of the groove and the light reflected by the recording layer at the site of the dikes. At registration of information the groove is followed so that the registration proceeds quite accurately.

A supporting plate of plastic having a groove can be made by a well-known process such as a compression process, an injection moulding process or a compression moulding process. For example, a synthetic resin such as a thermoplastic material is pressed against a die, the surface of which comprises the negative of the desired groove, at an elevated temperature. After cooling the release of the pressure the resultant plate in which a negative of the groove of the die is formed, is removed from the die. In the case of a supporting plate of glass an extra top layer of a synthetic resin which comprises the groove may be provided. Such a laminated supporting plate can be manufactured by providing a layer of a liquid light-curable lacquer on a die surface which comprises the negative of the desired groove. A glass plate is placed upon the layer, which layer subsequently is cured by irradiation via the glass. The assembly of glass plate and the cured lacquer layer bonded thereto and in which layer the negative of the groove of the die has been formed, is removed from the die. A suitable lacquer is a mixture of light-curable acrylates.

The above-mentioned alkylpyrylium-squarylium compounds of formula A are novel substances. The invention also relates to said novel compounds.

The substances according to formula A can be manufactured by means of methods which are used for the manufacture of similar compounds or are analogous thereto.

For example, the compounds of formula A are manufactured by reacting a compound of the formula

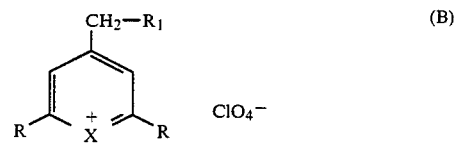

(B)

wherein R, $R_1$ and X have the above-mentioned meanings, with squaric acid which satisfies the formula

 (C)

The reaction is carried out in the presence of a solvent, for example, butanol. Preferably toluene is also added as a solvent so that the water formed during the reaction can be removed azeotropically. A base, in particular an organic base, for example quinoline, is also added to the reaction mixture. The reaction takes place at an elevated temperature, for example at the boiling point of the solvents used.

BRIEF DESCRIPTION OF THE DRAWING

The sole FIGURE in the drawing is a cross-sectional view of a recording element of the invention.

DETAILED DESCRIPTION OF THE INVENTION

The invention will now be described in greater detail with reference to the following examples and to the drawing, the sole FIGURE of which is a cross-sectional view of a recording element according to the invention.

EXAMPLE 1

Preparation of 1,3-bis[2,6-di-t-butyl-4H-thiopyran-4-ylidene)methyl]-2,4-dihydroxy-dihydroxide-cyclobutene diylium-bis{inner salt}. A mixture of 1.45 g of 2,6-di-t-butyl-4-methylthiopyrylium perchlorate, 0.256 g of squaric acid, 0.58 g of freshly distilled quinoline, 50 ml of butanol-1 and 30 ml of toluene is heated to the boiling point for 2 hours, while the water formed is distilled off azeotropically. After cooling, the greenish brown reaction mixture is filtered and evaporated on a rotation evaporator. The residue is taken up in toluene, filtered, evaporated again and finally recrystallized from 25 ml of acetonitrile. Yield 0.70 g (60%) of gold-shining crystals which decompose at 244° C.

EXAMPLE 2

Preparation of 1,3 bis(2,6-di-t-butyl-4H-pyran-4-ylidene)methyl-2,4-dihydroxy-dihydroxide-cyclobutene diylium-bis inner salt.

A mixture of 7.67 g of 2,6-di-t-butyl-4-methylpyrylium perchlorate, 1.43 g of squaric acid, 2.23 g of quinoline, 100 ml of butanol-1 and 60 ml of toluene is heated to the boiling point for 3 hours while the water formed is distilled of azeotropically. After cooling, another 60 ml of toluene area added to the resultant green solution and the quinolinium perchlorate is filtered off. After evaporation of the filtrate and recrystallization from 35 ml of nitromethane, 4.8 g (78%) of gold-brown crystals are obtained which melt under decomposition at 242.5°–243.5° C.

EXAMPLE 3

A 0.8% solution of the alkylpyrylium-squarylium dye, manufactured according to Example 1, in methylethylketone is filtered and applied to a slowly rotating disk-shaped substrate 1 of the sole FIGURE of the drawing which substrate comprises a glass supporting plate 2 which on one side has a layer 3 of a light-cured lacquer which comprises a mixture of acrylates. The lacquer layer 3 comprises a spiral-shaped groove 4 having a width of 0.7 μm and a depth of 60 nm. The bridge parts (dikes) 5 present between adjacent turns of the groove have a width of 1 μm.

While the above-mentioned dye solution is applied to the lacquer layer 3 the speed of rotation of substrate 1 is increased to a maximum value of 1600 rpm. The dye solution is partly flung aside, the solvent is evaporated and a solid amorphous dye layer 6 is obtained having a thickness of 60 nm at the area of the bridge parts 5.

The dye layer 6 is exposed to laser light which is focused on the dye layer through the substrate 1. The emission wavelength of the laser light is 800 nm. The power of the laser used is 0.5 mW. Upon exposure to this weak laser light beam, no variations occur in the layer 6. The structure of the layer 6 can be traced by means of the laser light and in particular the groove 4 can be followed by the laser light. Upon scanning with laser light, substrate 1 is rotated at, for example, a speed of 5 m/s, while the laser light beam moves radially over the surface of the disk. As already said, the laser light can follow the groove. Said so-called track following is possible due to the phase difference of the light which is reflected by dye layer 6 at the area of the groove 4 and at the area of the bridge portions 5.

When information is recorded the dye layer 6 is exposed through the substrate 1 to laser light which is pulsated in accordance with the data to be recorded. The wavelength of the recording laser light is 800 nm. The power of the recording laser is considerably higher than that of the above-described scanning laser and is, for example, 10 mW on the dye layer. The pulse duration is short and is from 10 to 100 ns. The speed of the disk at the laser light spot is 5 m/s. As a result of the exposure a strong local heating of the dye layer 6 occurs. The dye becomes liquid and moves towards the edges of the molten area. The result is a cavity (information bit) formed in dye layer 6.

At the area of the cavity the thickness of the dye layer 6 is reduced. In consequence of this the reflection is also reduced. The information bit can be traced by means of weak scanning laser light on the basis of the reduction in reflection.

The diameter and the depth of the cavity are dependent on the amount of light energy per pulse. The threshold energy, i.e. the energy minimum required to obtain an optically readable information bit, is low and is 0.05 nJ per pulse. A very shallow cavity is obtained. When the pulse energy increases the information bit becomes larger and deeper. The CNR (carrier-noise ratio) which is the ratio of the strength of the signal to the strength of the noise originating from the carrier (substrate) also increases. With an energy of approximately 0.5 nJ per pulse, a CNR value of 59 dB is reached. The diameter of the cavity is about 1.5 μm. The depth is 60 nm.

The above-described experiments have also been carried out with a recording element according to the invention which corresponds for the greater part to the element according to the FIGURE but with the difference that recording layer 6 is manufactured from the alkyl-pyrylium-squarylium dye as described in Example 2.

The thickness of the dye layer between adjacent turns of the groove at the area of the bridge portions 5 is 110 nm. The dye layer is provided according to the above-described spin-coating process in which a 0.75% solution of the dye in n-propanol is used. The recording of information and the scanning of both the groove 4 and of the recorded information bits are carried out by means of laser light having an emission wavelength of 750 nm which is focused on the dye layer 6 via the substrate 1. The speed of the disk at the light spot is 5 m/s, both upon recording and upon scanning information. The recording of information is carried out by means of pulsated laser light.

The amount of laser light energy per pulse is varied by varying the pulse time from 10 to 100 ns with a laser power of 5 mW on the dye layer. Experiments have demonstrated that the minimum energy required to record a bit, hence to form a cavity which can just be traced by means of scanning laser light, is low and is 0.1 nJ per pulse. With a pulse energy of 0.31 nJ, a CNR value of 50 dB is reached. With pulse energies equal to or larger than 0.3 nJ, holes are formed, i.e. cavities, which extend throughout the thickness of 110 nm of the dye layer 6 down to the lacquer layer 3.

Similar experiments have been carried out with a recording element in accordance with the invention which as regards construction corresponds to the element shown in the FIGURE. Instead of a supporting plate 2 of glass, a carrier plate of polymethylmethacrylate is used which on one side comprises a light-cured lacquer layer which has a spiral-shaped groove in accordance with the lacquer layer 3 with groove 4 shown in the FIGURE. A dye layer 6 which consists of 50% of the alkylpyrylium-squarylium compound manufactured according to example 2 and of 50% of a pentamethine compound which satisfies the formula

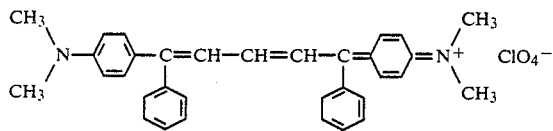

is provided on the lacquer layer.

The layer is provided by a spin coating process in which the starting material is a 1.5% solution of the dyes of the invention in acetonitrile. The resulting dye layer 6 of the drawing at the area of the groove 4 has a thickness of 85 nm. The recording laser light and the scanning laser light have emission wavelengths of 800 nm, and are focused on the dye layer via the substrate. Upon recording and scanning information the speed of the recording element at the light spot is 15 m/s. The recording of information is carried out by means of pulsated laser light originating from a laser having a power of 12 m on the dye layer. The pulse duration is 70 ns. Due to the high speed of the element the light spot of the focused laser light beam moves over a distance of 1 μm over the dye layer for the pulse time of 70 ns. The resulting information bits have the shape of a trough-like cavity. By variation of the speed the length of the trough-like cavity can be varied. Also as a result of the very low thermal conductivity in the dye laser trough-like cavities having mutually different and accurately defined longitudinal dimensions can be obtained so that analogue recording of information is possible which is deemed of essential importance for the recording of complicated video information.

What is claimed is:

1. A recording element in which information can be recorded and read optically and which recording element comprises a supporting plate bearing a recording layer comprising a squarylium dye, characterized in that the dye is a pyrylium- or thiopyrylium-squarylium compound of the formula

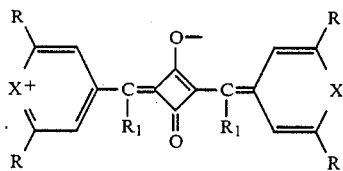

wherein

X is an oxygen atom or a sulphur atom,

R is an alkyl group having at least 3 carbon atoms, and $R_1$ is a hydrogen atom or a methyl group.

2. A recording element as claimed in claim 1, characterized in that R is a tertiary butyl group.

3. A recording element as claimed in claim 1 characterized in that the recording layer also comprises a pentamethine dye.

4. A recording element as claimed in claim 2, characterized in that the recording layer also comprises a pentamethine dye.

* * * * *